(12) United States Patent
Lo et al.

(10) Patent No.: US 9,504,876 B2
(45) Date of Patent: Nov. 29, 2016

(54) SCUBA MASK STRUCTURE AND MANUFACTURING PROCESS THEREOF

(71) Applicants: IN CREATIVE CO., LTD., New Taipei (TW); Michael James Piantoni, New Taipei (TW)

(72) Inventors: Hsin-Yu Lo, New Taipei (TW); Michael James Piantoni, New Taipei (TW)

(73) Assignees: IN CREATIVE CO., LTD., New Taipei (TW); Michael James Piantoni, New Taipei (TW)

( * ) Notice: Subject to any disclaimer, the term of this patent is extended or adjusted under 35 U.S.C. 154(b) by 0 days.

(21) Appl. No.: 14/662,241

(22) Filed: Mar. 19, 2015

(65) Prior Publication Data

US 2016/0271454 A1    Sep. 22, 2016

(51) Int. Cl.
*A63B 33/00* (2006.01)
*B63C 11/12* (2006.01)
*B29C 45/14* (2006.01)
*B63C 11/02* (2006.01)
*B29L 31/52* (2006.01)

(52) U.S. Cl.
CPC ....... *A63B 33/002* (2013.01); *B29C 45/14475* (2013.01); *B63C 11/12* (2013.01); *B29L 2031/5254* (2013.01)

(58) Field of Classification Search
CPC . B63C 11/12; B63C 2011/128; B63C 11/16; B63C 11/02; B63C 2011/021; B63C 2011/123; B63C 2011/126; B63C 2011/121; G02B 27/017; G02B 27/0172; G02B 23/22; A63B 33/002; A63B 2207/00; A63B 33/00; G03B 17/08; G03B 2215/0542; A62B 18/084; G02C 3/02; G02C 3/003; A41D 13/1161; Y10S 2/909
See application file for complete search history.

(56) References Cited

U.S. PATENT DOCUMENTS

| | | | | |
|---|---|---|---|---|
| 3,743,380 A * | 7/1973 | Fugitt | ................. | F21L 14/02 359/489.07 |
| 3,787,688 A * | 1/1974 | Stone | ................. | G02B 23/22 2/2.15 |
| 3,936,162 A * | 2/1976 | Krakau | ................. | A61B 3/063 351/222 |
| 4,035,816 A * | 7/1977 | Winnacker | ............. | G03B 17/08 396/28 |
| 4,041,507 A * | 8/1977 | Chan | ................. | G03B 19/04 396/25 |
| 4,112,521 A * | 9/1978 | Uke | ................. | B63C 11/12 2/428 |
| 4,714,333 A * | 12/1987 | Tamamura | ............. | G03B 17/08 396/29 |
| 4,919,631 A * | 4/1990 | Stafford | ................. | B63C 11/202 114/315 |
| 5,033,818 A * | 7/1991 | Barr | ................. | B63C 11/12 2/428 |
| 5,187,871 A * | 2/1993 | McDermott | ............ | B63C 11/12 2/430 |
| 5,191,317 A * | 3/1993 | Toth | ................. | B63C 11/12 128/201.22 |
| 5,216,454 A * | 6/1993 | Berke | ................. | A63B 33/002 2/430 |
| 5,353,054 A * | 10/1994 | Geiger | ................. | H04N 7/188 345/8 |

(Continued)

*Primary Examiner* — Bobby Muromoto, Jr.
(74) *Attorney, Agent, or Firm* — Leong C. Lei

(57) ABSTRACT

A scuba mask structure includes at least one window section, a mounting seat for receiving an attachable device to removably attach thereto, and an integrally formed supporting section. The supporting section is insert molded around a periphery of the window section and an end of the mounting seat so that the mounting seat is at one side of the supporting section and the window section is at another side of the supporting section so as to form a seamless scuba mask. Such a structure is formed by first placing the window section and the mounting seat in a mold and forming through injection the support section to be insert molded with the mounting seat and the window section for wrapping around a periphery of the window section so that a seamless scuba mask that, in the entirety thereof, has an integrally formed configuration.

8 Claims, 6 Drawing Sheets

(56) References Cited

U.S. PATENT DOCUMENTS

| | | | | |
|---|---|---|---|---|
| 5,359,371 A * | 10/1994 | Nolan | B63C 11/12 | 2/441 |
| 5,523,804 A * | 6/1996 | Nolan | B63C 11/12 | 351/41 |
| 5,530,631 A * | 6/1996 | Smith | B63C 11/02 | 16/337 |
| 5,628,308 A * | 5/1997 | Harges, Jr. | A41D 13/1153 | 128/201.25 |
| 5,764,334 A * | 6/1998 | Berke | A63B 33/002 | 2/447 |
| 5,767,932 A * | 6/1998 | Gordon | B63C 11/12 | 351/158 |
| 5,929,453 A * | 7/1999 | Andrews | G01N 21/645 | 250/461.1 |
| 5,980,035 A * | 11/1999 | Berke | A63B 33/002 | 351/43 |
| 5,997,138 A * | 12/1999 | Suiter | A63B 33/002 | 351/41 |
| 6,061,522 A * | 5/2000 | Inoue | G03B 15/05 | 396/25 |
| 6,127,990 A * | 10/2000 | Zwern | G09B 21/008 | 345/158 |
| 6,204,974 B1 * | 3/2001 | Spitzer | G02B 27/017 | 359/630 |
| 6,390,640 B1 * | 5/2002 | Wong | B63C 11/12 | 351/148 |
| 6,889,390 B1 * | 5/2005 | Morgan | B63C 11/12 | 128/201.27 |
| 7,234,463 B2 * | 6/2007 | Jacob | B63C 11/12 | 128/201.11 |
| 7,882,833 B2 * | 2/2011 | Jacob | B63C 11/12 | 128/201.11 |
| 2002/0124299 A1 * | 9/2002 | Malcolm | A61F 9/025 | 2/439 |
| 2003/0226194 A1 * | 12/2003 | Vossler | G02C 3/003 | 2/452 |
| 2005/0051164 A1 * | 3/2005 | Hutter | B63C 11/16 | 128/201.11 |
| 2005/0108801 A1 * | 5/2005 | Morgan | B63C 11/12 | 2/9 |
| 2005/0273916 A1 * | 12/2005 | Kuhn | B63C 11/12 | 2/428 |
| 2007/0115387 A1 * | 5/2007 | Ho | A45C 11/38 | 348/375 |
| 2007/0174952 A1 * | 8/2007 | Jacob | B63C 11/12 | 2/426 |
| 2008/0304362 A1 * | 12/2008 | Fleming | H04B 11/00 | 367/134 |
| 2013/0107031 A1 * | 5/2013 | Atkinson | H04N 1/00347 | 348/81 |
| 2013/0242110 A1 * | 9/2013 | Terre | H04N 5/2251 | 348/164 |
| 2014/0041106 A1 * | 2/2014 | Shau | A63B 33/00 | 2/438 |
| 2014/0157496 A1 * | 6/2014 | Ginther | A61F 9/025 | 2/439 |
| 2014/0177394 A1 * | 6/2014 | Fleming | H04B 11/00 | 367/131 |
| 2015/0175248 A1 * | 6/2015 | Hollis | B63C 11/26 | 340/850 |
| 2015/0234189 A1 * | 8/2015 | Lyons | G02B 27/0172 | 345/174 |
| 2015/0234192 A1 * | 8/2015 | Lyons | G02B 27/0172 | 345/8 |
| 2015/0238821 A1 * | 8/2015 | Gallo | A63B 33/002 | 2/431 |
| 2015/0297952 A1 * | 10/2015 | Lo | B29D 99/0071 | 2/431 |
| 2016/0062149 A1 * | 3/2016 | Gerton | G02C 7/104 | 351/43 |

* cited by examiner

SCUBA MASK STRUCTURE AND MANUFACTURING PROCESS THEREOF

TECHNICAL FIELD OF THE INVENTION

The present invention generally relates to a scuba mask structure and a manufacturing process thereof, and more particularly to a scuba mask structure that is integrally formed so that no assembling is necessary and allows for easy combination with diving equipment and a manufacturing process of the scuba mask.

DESCRIPTION OF THE PRIOR ART

In doing underwater activities either for working or for entertainment, to protect human eyes from being irritated by liquids, such as seawater, and to allow people to clearly observe the surrounding environment in water, swimming goggles are available. The conventional products can be generally classified into two categories in respect of the functionality thereof, which are swimming goggles for swimming and scuba masks for scuba diving. Taking the scuba mask as an example, the conventional ways of manufacturing scuba masks are generally complicated processes, including the making of components by using molds and additional assembling of the components, making the entire process very complicated.

Further, with the progress of science and technology, a lot of products have been developed with techniques for protection against water splashing or even dipping in water. Such techniques have also been applied to diving activities, and some of the most commonly known are underwater devices for underwater ecosystem recording or for picture taking for memory of users, such as cameras and camcorders.

Various solutions have been proposed by the manufacturers to combine such devices with diving activities. However, there are problems and drawbacks to be overcome.

(1) A user might need to hold the device with his or her hands and this affects the flexibility and movement of the user in water.

(2) Carrying such a device by attaching it to a specific location of the user's body is still inconvenient and troublesome.

(3) Attaching such a device to a scuba mask is a solution for being easy to use, yet the manufacturing is difficult.

that are available in the market are made to resist

It is thus a challenge of the inventor and the manufacturers of this business to provide a solution to overcome the above-discussed problems and drawbacks.

SUMMARY OF THE INVENTION

In view of the above-mentioned drawbacks, the present invention aims to provide a scuba mask structure, as well as a manufacturing process thereof, that comprises a lens, a lens frame, and a mounting seat for mounting an attachable device, which are all integrally formed together as a unitary structure so that no assembling is needed, allowing for a good yield rate, a low cost, and a simple structure.

The primary object of the present invention is to provide an integrally formed supporting section that is insert molded around a periphery of a window section and an end of a mounting seat in such a way that the mounting seat is set at one side of the supporting section so as to achieve the advantages of being easy to operate, having a simple structure, requiring no assembling, low cost, and high production yield rate.

To achieve the above object, the present invention provides a structure that comprises an integrally formed supporting section, at least one window section, and a mounting seat for receive an attachable device to removably attach thereto. The supporting section is formed through being insert molded with the window section and the mounting seat so as to form a seamless scuba mask. As such, in the manufacturing process, the window section and the mounting seat are first placed in a mold to be processed together in order to form, through an injection operation, the supporting section that wraps around a periphery of the window section at one side thereof and forms the mounting seat at another side thereof for receiving the attachable device to attach thereto, whereby a scuba mask of which the entirety structure is integrally formed in a seamless coupling manner is provided.

With the above techniques, the issue of using other facility, such as a camera, while doing diving activities can be addressed and a practical advantage is achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
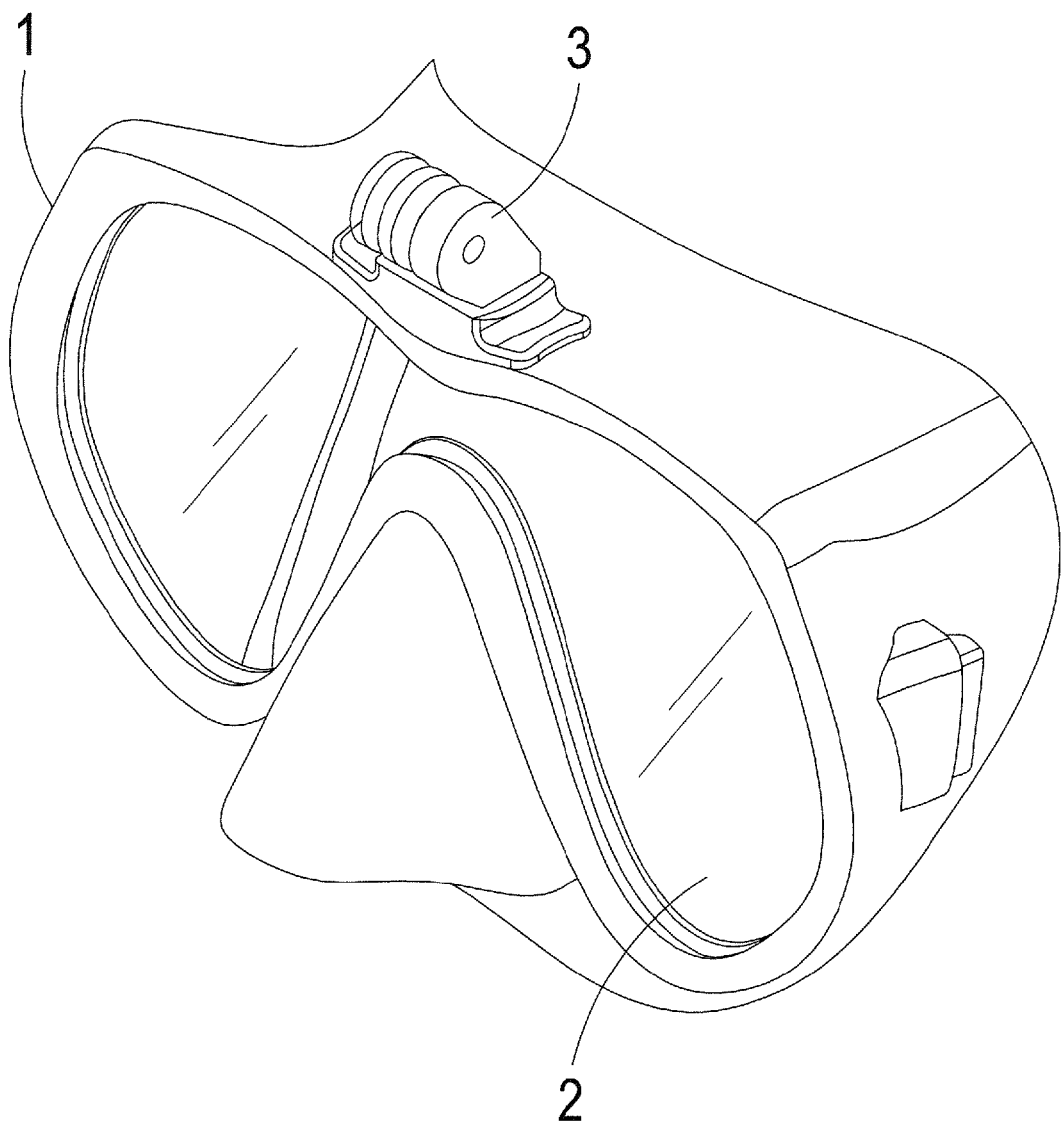
FIG. 1 is a perspective view showing a preferred embodiment of the present invention.
Figure 2:
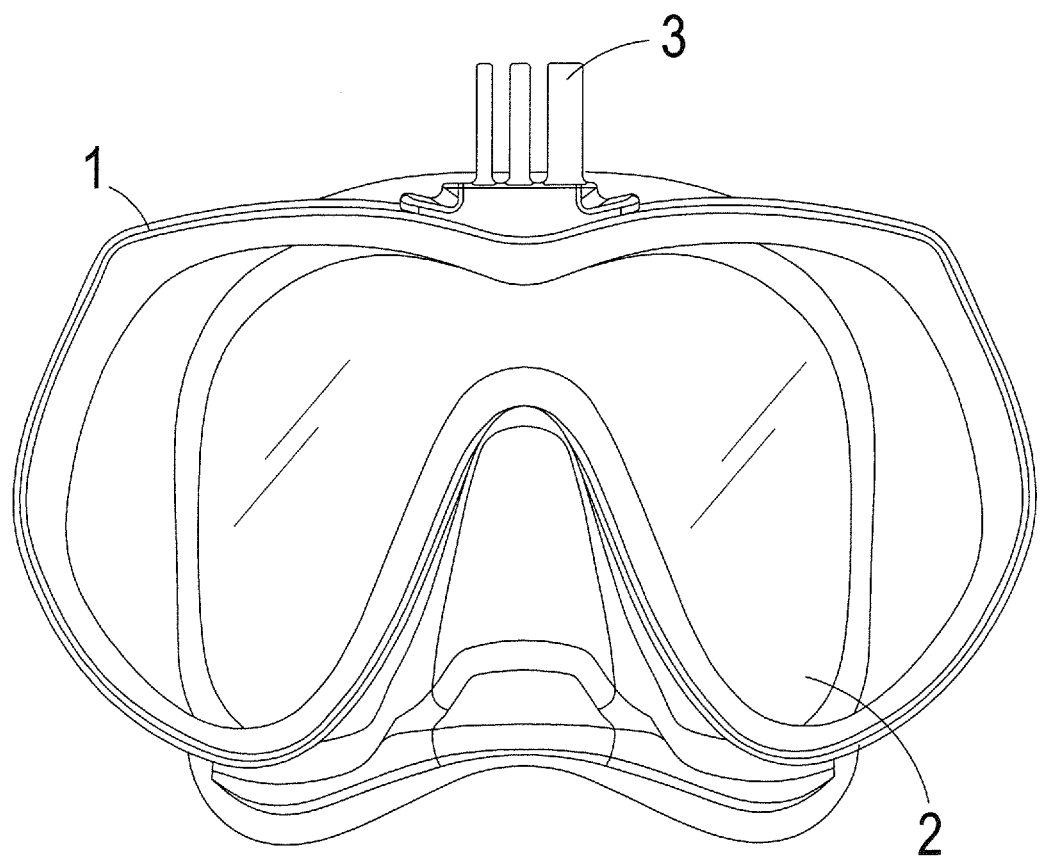
FIG. 2 is a front view of the preferred embodiment of the present invention.
Figure 4:
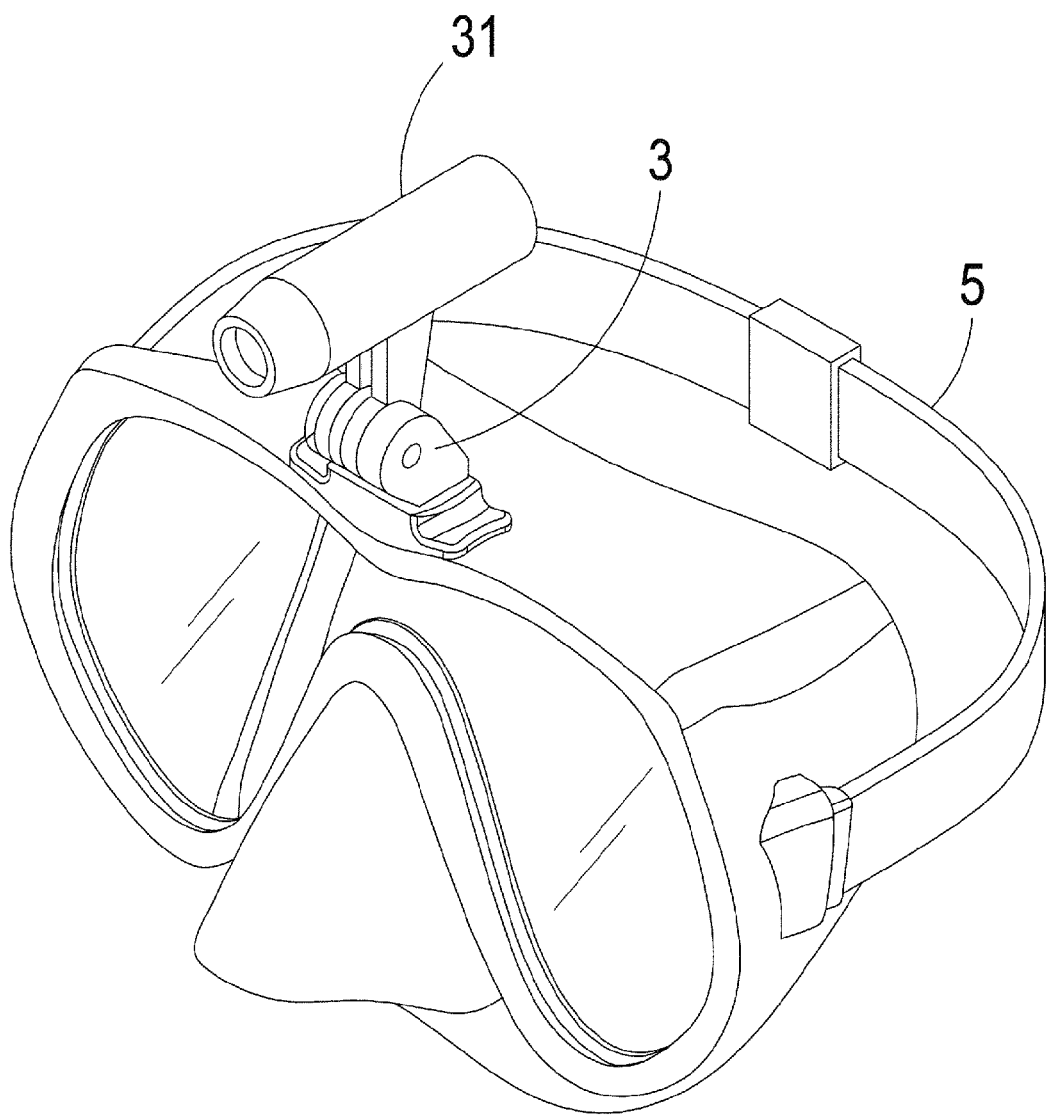
FIG. 4 is a perspective view illustrating an example of use of the preferred embodiment of the present invention.

Referring to FIGS. 1, 2, and 4, which are respectively a perspective view and a front view of a preferred embodiment of the present invention and a perspective view illustrating a use of the present invention, the drawings clearly show that the present invention comprises:

an integrally-formed supporting section 1;

at least one window section 2, which has a periphery embedded in and wrapped by a material of the supporting section 1, wherein the window section 2 comprises a light-transmitting lens and the wrapping arrangement is achieved with an insert molding operation;

a mounting seat 3, which has an end is embedded in and wrapped by the material of the supporting section 1, wherein the mounting seat 3 is structured to receive an attachable device 31 to attach and mount thereto in a removable manner, the attachable device 31 being one of an imaging device or a lighting device, and the wrapping arrangement is achieved with an insert molding operation; and a head strap 5, which is coupled to the support section 1.

Figure 3:
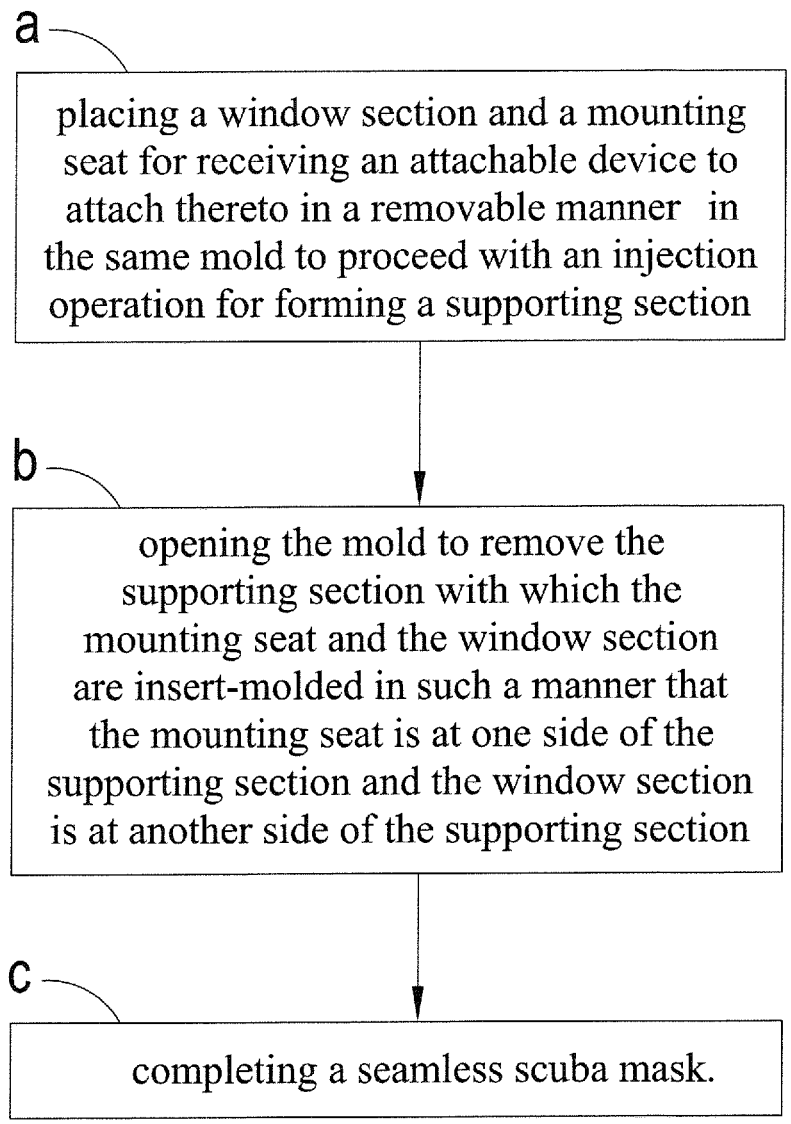
FIG. 3 is a flow chart illustrating a manufacturing process according to an embodiment of the present invention.

Referring also to FIG. 3, which is a flow chart illustrating a manufacturing process according to a preferred embodiment of the present invention, the drawing clearly shows that the manufacturing process of the above components comprises:

(a) placing a mounting seat and a window section in the same mold to proceed with an injection operation for forming a supporting section, wherein the mounting seat is structured to receive an attachable device to attach and mount thereto in a removable manner;

(b) opening the mold to remove the supporting section with which the mounting seat and the window section are insert-molded in such a manner that the mounting seat is at one side of the supporting section and the window section is at another side of the supporting section; and (c) completing a seamless scuba mask.

Referring collectively to FIGS. 1-4, which are respectively a perspective view and a front view of a preferred embodiment of the present invention, a flow chart of a manufacturing process of the preferred embodiment of the present invention, and a perspective view illustrating a use of the preferred embodiment of the present invention, these drawings clearly show that present invention has advantages of simple structure, requiring no assembling, simple process, low cost, and high yield rate. In addition, to operate, a user puts the head strap 5 on his or her head, where the supporting section 1 is designed for being manufactured with the same material through an integrally forming process with the window section 2 and the mounting seat 3 being embedded therein and wrapped thereby by means of insert molding, whereby the supporting section 1 wraps around a periphery of the window section 2 to provide the present invention with an impact-resistant and pressure-durable feature and also to allow the present invention to receive an attachable device 31, such as an imaging device and a lighting device, to directly and removably attach to the mounting seat 3, where the mounting seat 3 is fixed, through insert molding, to one side of the supporting section 1 so as to provide a robust structure, making the entire structure an integrally-formed seam-free configuration, which is totally different from the known scuba masks in that no damage to the outside appearance may occur to cause water leaking, and as such, wearing is carried out and completed.

Figure 5:
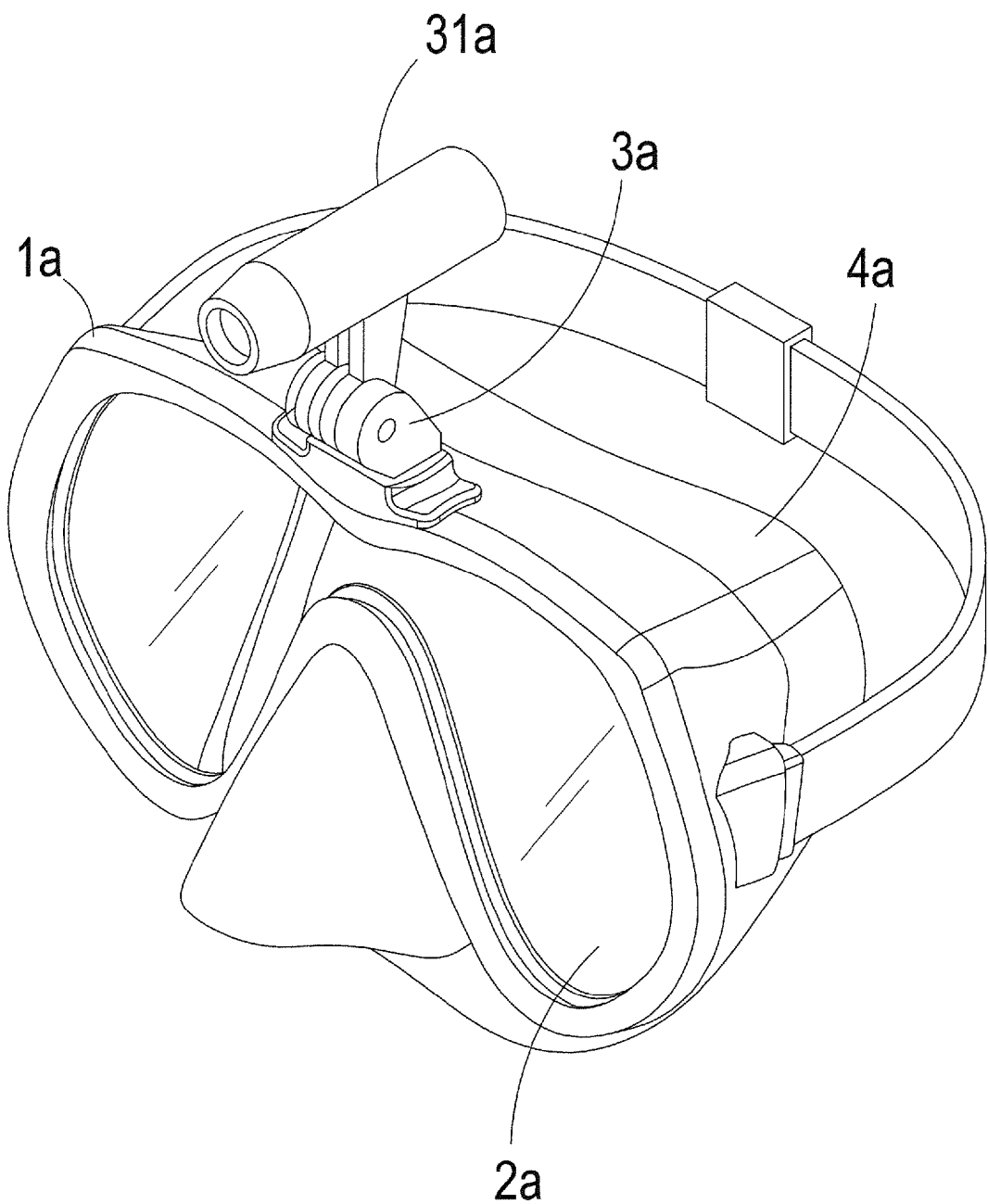
FIG. 5 is a perspective view showing another embodiment of the present invention.
Figure 6:
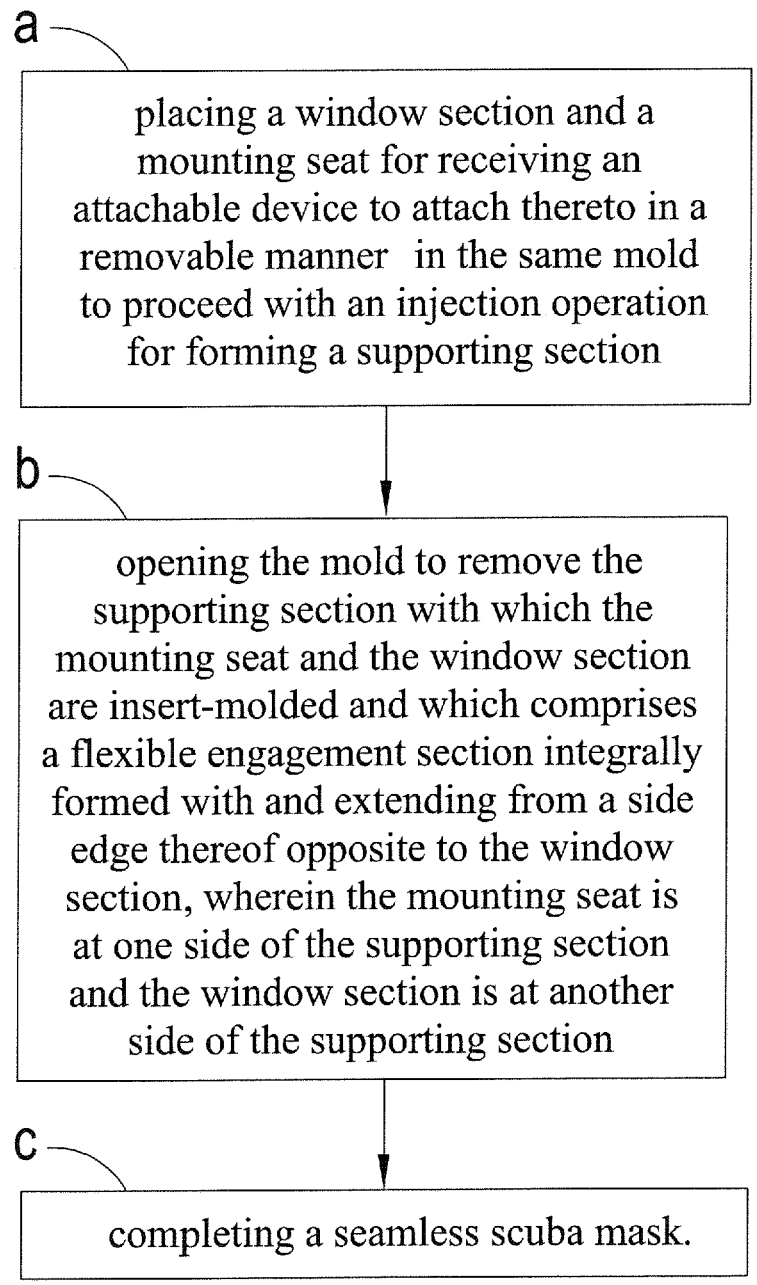
FIG. 6 is a flow chart illustrating a manufacturing process according to another embodiment of the present invention.

Further referring to FIGS. 5 and 6, which are respectively a perspective view of another embodiment of the present invention and a flow chart illustrating a manufacturing process of another embodiment of the present invention, the structure and the manufacturing process of this embodiment are similar to those of the previous embodiment but a flexible engagement 4a is additionally provided and is integrally formed with and extends from a side edge of the support section 1a that is opposite to the window section 2a. The flexible engagement section 4a is made of a flexible material and is integrally formed with the supporting section 1a when the scuba mask is removed from the mold. In other words, the portion of the present invention that is engageable with and complies with a face of the user must be made of a flexible material; however, the overall structure is generally achieved based on being integrally formed. The manufacturing process is generally similar to that of the previous embodiment, where a mounting seat 3a and a window section 2a are first placed in the same mold to proceed with processing and then the mold is opened to remove a supporting section 1a with which the mounting seat 3a and the window section 2a are insert molded in such a way that the supporting section 1a comprises a flexible engagement section 4a integrally formed with and extending from a side edge thereof opposite to the window section 2a and the mounting seat 3a is at one side the supporting section 1a, while the window section 2a is at another side of the supporting section 1a, whereby when worn by a user, the flexible engagement section 4a is in tight and compliant engagement with a contour of the face of the user, making wearing comfortable without causing a feeling of being compressed resulting from an attachable device 31a attached to the mounting seat 3a. Most importantly, the present invention provides a window section 2a and a mounting seat 3a that are coupled to the supporting section 1a through insert molding and the flexible engagement section 4a is integrally extending from the supporting section 1a so that the present invention has a feature of a seamless configuration.

The above provides a description to preferred embodiments of the present invention, which is not intended to limit the scope of the attached claims. It is appreciated that all simple modifications and equivalent variations of the structure according to the contents provided in the disclosure and drawings of the present invention are considered included in the scope of the claims of the present invention.

Thus, the key factors of the scuba mask structure and the manufacturing process thereof that improve the prior art techniques are as follows. The entire manufacturing process is carried out for achieving a seamless configuration, where the process is simple and the structure is simple and a visually unitary integrally-formed configuration is provided, so that the cost of the manufacturing process can be lowered down, the product yield rate can be increased, and easy operation and preservation by users are achievable.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A scuba mask structure, comprising:
   at least one window section;
   a mounting seat, which is adapted to receive an attachable device to attach thereto; and
   an integrally formed supporting section, which is insert-molded around a periphery of the window section and an end of the mounting seat in such a way that the mounting seat is at one side of the supporting section and the window section is at another side of the supporting section, whereby a scuba mask free of joint seams is provided;

wherein the at least one window section that is insert-molded in the integrally formed supporting section such that a periphery of the at least one window section is embedded in and wrapped by a material of the supporting section; and wherein the mounting seat that is insert-molded in the integrally formed supporting section such that an end of the mounting seat is embedded in and wrapped by the material of the supporting section.

2. The scuba mask structure according to claim 1 further comprising a head strap mounted to the supporting section.

3. The scuba mask structure according to claim 1, wherein the supporting section has a side edge that is opposite to the window section and comprises a flexible engagement section integrally formed therewith and extending therefrom.

4. The scuba mask structure according to claim 1, wherein the attachable device comprises one of an imaging device and a lighting device.

5. A scuba mask manufacturing process, comprising the following steps:
(a) placing a window section and a mounting seat for receiving an attachable device to removably attach thereto in the same mold to proceed with an insert molding operation to form a supporting section that is molded around a periphery of the window section and an end of the mounting seat such that the periphery of the window section is embedded in and wrapped by a material of the supporting section and the end of the mounting is embedded in and wrapped by the material of the supporting section;
(b) opening the mold to remove the supporting section that is molded around the mounting seat and the window section; and
(c) completing a seamless scuba mask.

6. The scuba mask manufacturing process according to claim 5, wherein in step (b), a flexible engagement section is integrally formed on and extends from a side edge of the supporting section that is opposite to the window section.

7. The scuba mask manufacturing process according to claim 5 further comprising step (d) in which, after the molding of the scuba mask, the scuba mask is put on a head of a user by a head strap and the attachable device is removably attached to the mounting seat.

8. The scuba mask manufacturing process according to claim 5, wherein the attachable device comprises one of an imaging device and a lighting device.

* * * * *